J. DOUGHERTY.
Pots for Melting Glass.
No. 134,789.　　　　　　　　　　　　Patented Jan. 14, 1873.
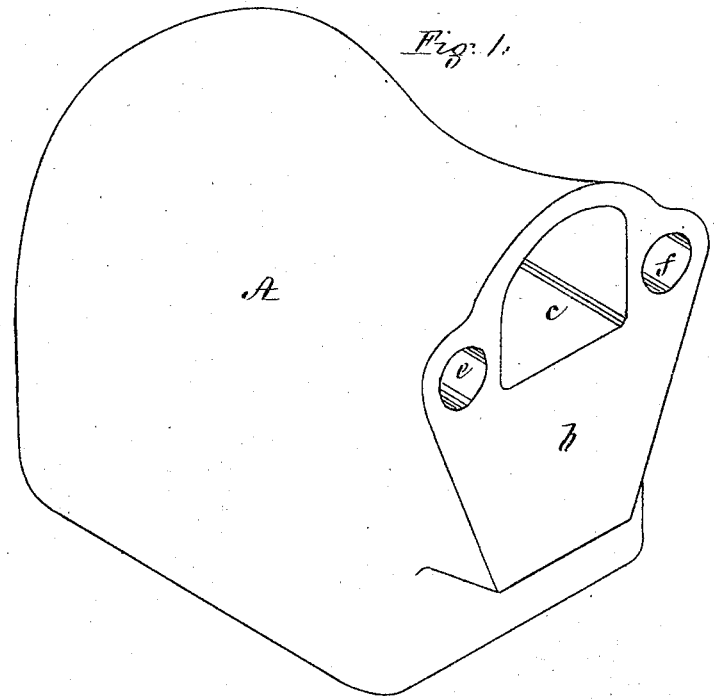
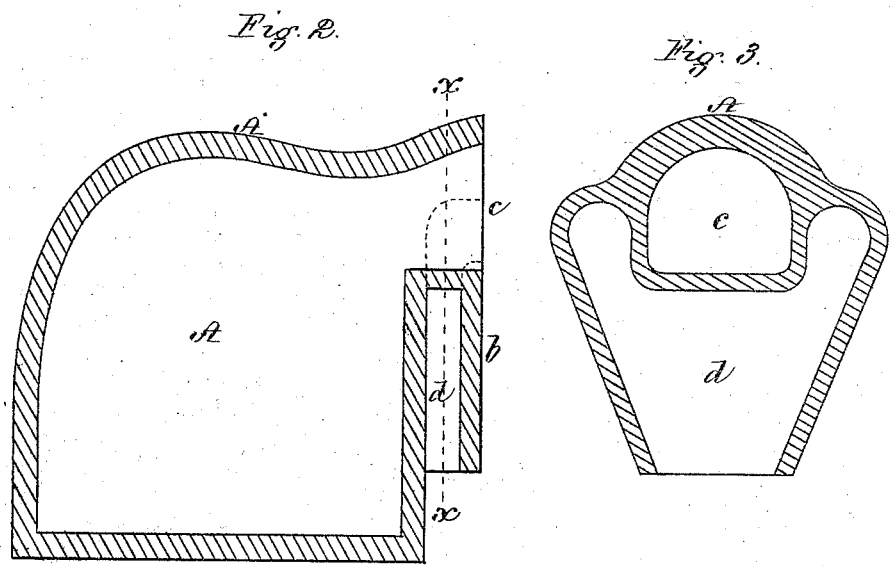

UNITED STATES PATENT OFFICE.

JOHN DOUGHERTY, OF SOMERVILLE, MASSACHUSETTS.

IMPROVEMENT IN POTS FOR MELTING GLASS.

Specification forming part of Letters Patent No. 134,789, dated January 14, 1873.

*To all whom it may concern:*

Be it known that I, JOHN DOUGHERTY, of Somerville, in the county of Middlesex and State of Massachusetts, have invented an Improvement in Pots for Melting Glass, of which the following is a full, clear, and exact description, reference being had to the accompanying drawing making part of this specification, in which—

Figure 1 is a perspective view of my improved pot for melting glass; Fig. 2 is a vertical section through the center of the same; and Fig. 3 is a vertical section on the line $x\,x$ of Fig. 2.

Covered pots for melting glass have heretofore been so constructed that the flames from the furnace could not come into contact with the front of the pot, which was consequently not heated to so great an extent as the other portions, and the unequal expansion and contraction thus produced frequently caused the breakage of the pot. Furthermore, as the back of the pot was heated so much more than the front, the fusing of the glass-forming materials therein was unequal, which caused the glass to be "corded" and not so clear as desired.

My invention has for its object to overcome these difficulties; and consists in a pot for melting glass, having its front provided with one or more flues, through which the flame from the furnace passes, whereby the front of the pot is heated equally with the other portions, thus securing equal expansion and contraction, which greatly lessens the liability of breakage, while it also insures the glass-forming materials in all portions of the pot being simultaneously fused, which materially improves the quality of the glass.

To enable others skilled in the art to understand and use my invention, I will proceed to describe the manner in which I have carried it out.

In the said drawing, A represents a covered fire-clay pot for melting glass. The front portion $b$ of this pot, below the mouth $c$, is enlarged, and within this enlargement is formed a flue, $d$, the lower end of which opens into the furnace in which the pot is set, so that the flames therefrom can pass up into contact with the front portion of the pot, which is thus heated as desired, and the glass-forming materials are simultaneously fused, which greatly improves the quality of the glass, while the unequal expansion and contraction, and consequent liability of breakage, incident to pots as heretofore constructed, are also avoided. The flames which pass up into the flue $d$ are conducted through openings $e\,f$, and thence by flues (not shown) into the "cone" above the furnace.

Instead of a single flue, $d$, two or more flues may be formed in the front of the pot, if preferred, and the flue or flues may be formed within the pot itself, as shown, or by attaching one or more pieces of the desired form to the front of the pot. The flue or flues in the front of the pot serve to retard the passage of the smoke and other products of combustion, and cause them to be retained within the furnace until they are nearly all consumed instead of passing directly up into the stack and being wasted, as has heretofore been the case; and this, in connection with the simultaneous heating of all portions of the pot, which causes the operation of melting to be performed more rapidly, effects a considerable saving in fuel.

*Claim.*

What I claim as my invention, and desire to secure by Letters Patent, is—

The within-described pot for melting glass, provided in front with one or more flues, $d$, substantially as and for the purpose set forth.

Witness my hand this 9th day of November, A. D. 1872.

JOHN DOUGHERTY.

In presence of—
P. E. TESCHEMACHER,
W. J. CAMBRIDGE.